United States Patent [19]
Balasubramanian et al.

[11] Patent Number: 5,602,873
[45] Date of Patent: Feb. 11, 1997

[54] FLASH NRZI INFRARED MODEM

[75] Inventors: Peruvemba S. Balasubramanian, Chappaqua; Nathan J. Lee, New City; Scott D. Lekuch, New York, all of N.Y.

[73] Assignee: International Business Machines Corporation, Armonk, N.Y.

[21] Appl. No.: 323,324

[22] Filed: Oct. 14, 1994

[51] Int. Cl.$^6$ ............................................. H04B 14/04
[52] U.S. Cl. .................... 375/242; 375/292; 375/342; 341/58; 341/69; 341/70
[58] Field of Search .................... 375/242, 254, 375/259, 285, 292, 293, 342; 341/58, 50, 68, 69, 70

[56] References Cited

U.S. PATENT DOCUMENTS

| | | | |
|---|---|---|---|
| 4,027,152 | 5/1977 | Brown et al. ........................... | 375/289 |
| 4,347,617 | 8/1982 | Murano et al. ......................... | 375/259 |
| 4,626,826 | 12/1986 | Fukuda et al. .......................... | 375/292 |
| 5,452,419 | 9/1995 | Di Giulio et al. ................ | 395/200.01 |

*Primary Examiner*—Stephen Chin
*Assistant Examiner*—Don Vo
*Attorney, Agent, or Firm*—Perman & Green

[57] ABSTRACT

A modulation scheme and system, compatible with both the asynchronous IRDA mode and the synchronous mode of IR communication, involves Non-Return-to-Zero-Inverted (NRZI) and Flash pulse encoding in conjunction with zero-bit stuffing. A digital data stream has a zero-bit inserted therein, before NRZI format encoding, whenever five consecutive one's are detected in the stream to enable the controller to distinguish the data from flags, which are exempt from the zero-bit insertion, and to provide enough transitions in the data so that the demodulator's digital phase lock loop can stay locked independent of the data contents. A Flash pulse (of from 3/16 to 5/16 of bit cell width, depending on the data rate) is generated whenever a transition is detected in the NRZI formatted data. The result, in keeping with IRDA modulation, is that a Flash pulse is generated whenever a zero occurs in the data stream. On the demodulation side, whenever a Flash pulse is received, the level of the receive line is toggled resulting in an output in NRZI format. Using this modulation scheme with a serial controller which supports NRZI and bit-stuffing, a system may be constructed that uses the controller's phase lock loop to send and receive data synchronously.

23 Claims, 3 Drawing Sheets

FLASH NRZI INFRARED MODEM

CROSS-REFERENCE

The present application and invention are related in subject matter to that in co-pending U.S. patent application Ser. No. 323,282, filed concurrently herewith, and having the same inventorship and assigned to the same assignee as this application.

BACKGROUND OF THE INVENTION

1. Field of the Invention

The present invention relates to modulating digital communications and more particularly to a modulation system and scheme utilizing infrared energy that is compatible with the asynchronous IRDA standard format as well as a synchronous format for infrared (IR) communications.

2. Problem to be Solved

The Infra Red Data Access Standard (IRDA) committee has adopted as its modulation scheme the use of a Flash pulse of either a 3/16 bit cell width or of a fixed 1.63 microsecond length whenever the data to be transmitted is zero in an asynchronous data format (with one start bit, one stop bit, and no parity bit). The demodulator prolongs the received pulse to a full bit cell width and inverts it to produce the correct level.

The IRDA modulation scheme further converts serial data from flash pulses to Non-Return-to-Zero (NRZ) format. While this is acceptable for an asynchronous transmission mode in which the NRZ line must change state at the beginning of each character, it is unacceptable for a synchronous mode where the NRZ line may not change state, i.e., its DC level, for a prolonged period of time. If consecutive 1's or 0's are received, the digital phase lock loop used in the demodulator for synchronous communication may lose the lock on the data if it is supplied in NRZ format. Consequently, the standard encoding technique lacks certain versatility and an alternative encoding method is required which is backwards compatible with the IRDA modulation while supporting higher speed synchronous communication.

3. Objects

It is therefore an object of the present invention to provide a modulation scheme that can support both asynchronous and synchronous data communication.

It is further object of the present invention to provide a Flash IR modulation scheme that can support both the IRDA standard and synchronous data communication.

It is another object of the present invention to provide a Flash IR modulation system that can support both the IRDA standard and synchronous data communication and is of low cost and easily implemented.

SUMMARY OF THE INVENTION

The present invention involves a modulation scheme and system that can support both asynchronous and synchronous data communication, and preferably that is compatible with both the asynchronous IRDA mode of infrared communication and the synchronous mode of infrared communication. As noted above, the NRZ format for data used with asynchronous communication is not suitable for synchronous communication due to the fact that it may stay in one DC level for an arbitrary period of time. If no transitions occur, the digital phase lock loop used in synchronous communication may lose its lock on the data bit cell boundaries. By way of a solution to overcome this problem, the invention adopts a Non-Return-to-Zero-Inverted (NRZI) with Flash pulse encoding in conjunction with zero bit insertion for the data encoding scheme.

In NRZI transmission, a transition is generated on the outgoing data line every time a zero is detected in the data stream as illustrated in FIG. 1. Similarly, in NRZI reception, a zero bit is indicated for every bit period in which a transition is detected on the incoming data line. An NRZI receiver is therefore able to detect the bit cell boundary of the incoming data each time a zero is received since a transition occurs on the line at the beginning of the bit cell. An NRZI receiver will stay locked on the incoming data as long as a sufficient number of zeros are received within a limited period of time.

In the zero-bit insertion part of the scheme, a zero is inserted whenever five consecutive one's are detected in the data stream. This strategy uses the bit insertion for two purposes. The first role of the zero-bit insertion is to enable the controller to distinguish the data from flags which are exempt from the zero-bit insertion. The second role is to provide enough transitions in the data so that the digital phase lock loop can stay locked independent of the data contents. By ensuring that a zero will be received at least once every six bits, and using NRZI encoded data to feed the phase lock loop, the receiver is able to remain in phase with the data being received and the reliance on the DC component is effectively removed.

In implementing the NRZI modulation scheme of the invention with Flash pulses, digital data is first encoded in NRZI format as it goes through an IR MODEM. A pulse (having from 2/16 to 8/16 of a bit cell width, depending on the bit or data rate) is generated whenever a transition is detected in the NRZI formatted transmitting data. As seen in FIG. 1, the result of this modulation is the same as generating a Flash pulse whenever the binary digital data is zero. On the demodulation side, whenever a Flash pulse is received, the level of the receive line is toggled resulting in an output in NRZI format.

By using this modulation scheme with a serial controller which supports NRZI encoding and bit-stuffing, a system may be constructed that uses the phase lock loop in the controller to send and receive data synchronously.

DETAILED DESCRIPTION OF THE INVENTION

In a preferred embodiment, the Flash NRZI modulation technique of the present invention may be implemented as part of a custom ASIC designed to support multiple IR modulation formats and protocols. It may include a modified Z85C30 Serial Communication Controller Functional System Block (FSB), obtainable from VLSI Technology, Inc., Burlington, Mass., which provides the zero-bit stuffing and NRZI data format described herein. While this controller may be used without modification, a modified version is preferred in carrying out the invention. In particular, the controller described in the cross-referenced application, Ser. No. 323,282, is preferred.

Figure 1:
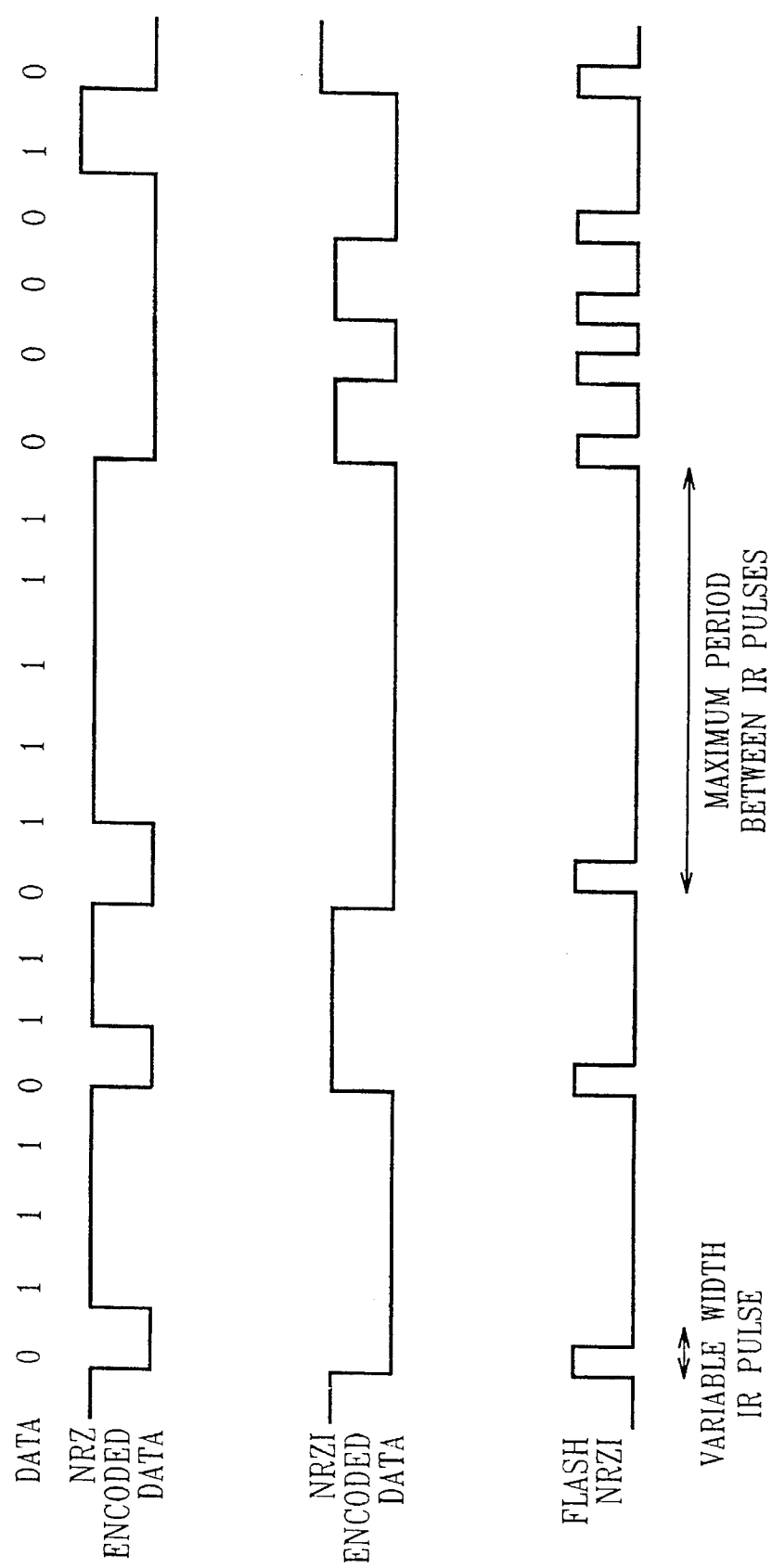
FIG. 1 illustrates a line of digital input data to be converted, e.g., into an infrared communication signal, and the various forms the signal takes upon encoding, showing respectively NRZ encoding, NRZI encoding, and Flash NRZI encoding in accordance with the invention.
Figure 2:
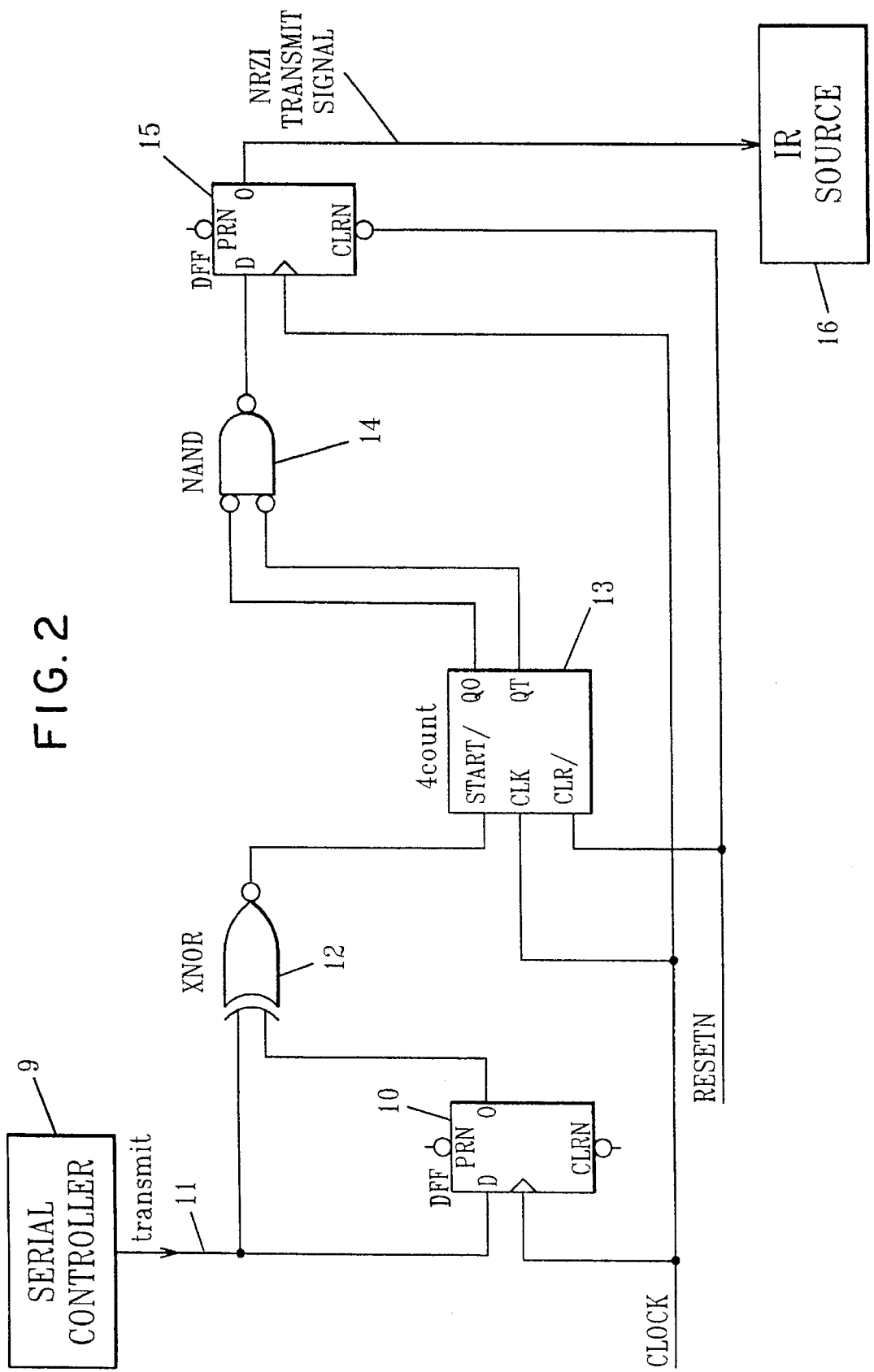
FIG. 2 is a schematic diagram illustrating a circuit for implementing a Flash NRZI modulator of the invention.

A circuit which provides the Flash NRZI modulation of the invention is shown in FIG. 2 and consists of a transmitting serial controller 9, that outputs a transmit signal on line 11, a delay flip-flop 10, which is used to sample the state of the transmit signal on line 11, and an Exclusive-OR gate 12 which generates a pulse if the line changes state between two clock cycles. The form of typical transmitting data input to the serial controller 9 is shown at the top of FIG. 1. Also shown is the form of the modulated signal output that results from modulating this transmitting data with NRZ encoding and with NRZI encoding. The binary digital input data at the top of Fig. 1 reflects the added bit-stuffing feature of the invention in that the controller 9 is adapted to insert a zero-bit, whenever five consecutive one's are detected in the data stream being encoded. This zero-bit insertion enables the circuit to distinguish the data from flags, which are exempt from the zero-bit insertion, and to provide enough transitions in the data so that the digital phase lock loop in the demodulator can stay locked independent of the data contents.

The output signal to be found on line 11 is modulated in NRZI format by controller 9. A pulse is generated by XOR 12 whenever a transition is detected in the incoming data on line 11. This pulse is fed to a four bit counter 13 which produces an output pulse that may be of a fraction, e.g., from $2/16$ to $8/16$, of a bit cell width, depending on the bit rate of the input data. Preferably the pulse is extended for $1/4$ of the bit cell period, and the extended pulse, output by AND gate 14 and synchronized by latch 15, is used to generate an IR Flash pulse from IR source 16, at each transition in the NRZI formatted signal. The form of the output Flash pulse train is such as shown in the bottom line in FIG. 1.

It will be noted that, flip-flop 10, counter 13, and latch 15 have clock inputs. However, although a clocked design is used here, the clock may be completely asynchronous with the transmitting serial controller 9. Consequently, in this circuit, the clock rate may be adjusted independently of the transmitting bit rate so that the output pulse duration may be set at a fraction, e.g., $1/2$, $1/4$, or $1/8$, of the input bit rate.

This feature is important in applications which require reduced power consumption. Also, because the Flash NRZI pulse width is not required to be a function of the bit cell period, a completely asynchronous circuit, such as an edge triggered monostable pulse generator, may be used at the output as latch 15. The digital electrical pulse train output by generator 15 is Flash NRZI encoded and fed to the IR transmitter 16 which converts each electrical pulse in the train into a corresponding flash of IR light.

Figure 3:
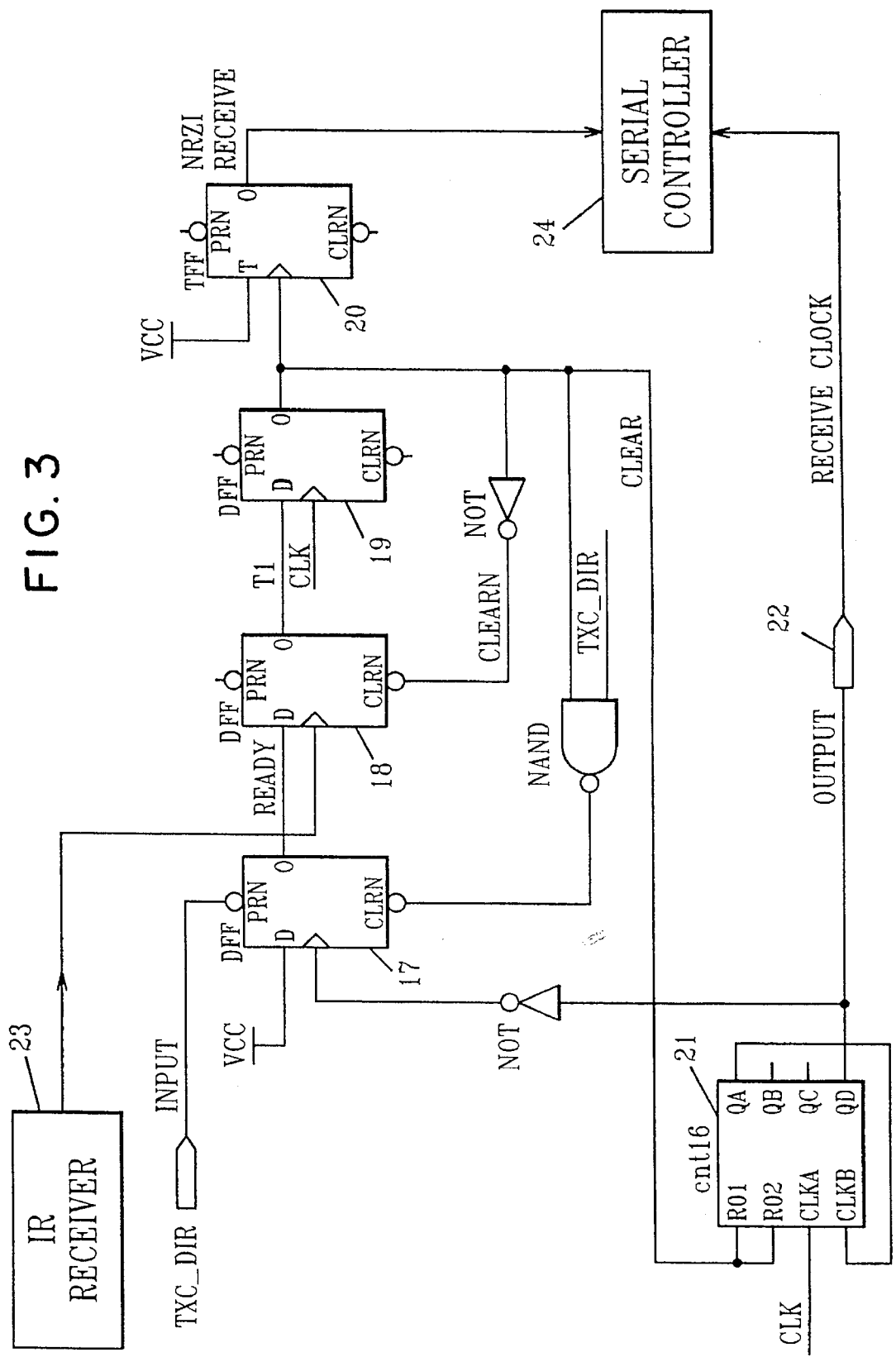
FIG. 3 is a schematic diagram illustrating a circuit for implementing a Flash NRZI demodulator of the invention.

At the other end of the IR data communications link is a Flash NRZI demodulator, shown in FIG. 3, having circuit logic that functions as a toggle flip-flop with an output that changes state whenever an IR light pulse is detected by receiver 23. This toggling electrical output is in the form of the NRZI signal from controller 9 in the modulator and is fed into a modified serial communication controller FSB 24. More particularly, in FIG. 3, latch 18 is set on the rising edge of an incoming pulse from IR receiver 23. Latch 19 is then set when the output of latch 18 becomes HIGH. The output of latch 19 both toggles the state of the output of flip-flop 20 and feeds back to reset latch 18 so that it is able to detect the rising edge of the next IR pulse. The output of flip-flop 20 will be the reconstructed NRZI signal fed to controller 24.

Two components are added to the logic circuitry to enhance this Flash NRZI demodulator. A latch 17 and a four bit counter 21 are included, the latter of which is reset by the output of latch 19 whenever an incoming Flash pulse is detected. In one mode, when the TXC_DIR line is HIGH, latch 17 is cleared by an incoming pulse and only reset when the counter 21 reaches count 16. Since the output of latch 17 must be HIGH for the output of latch 18 to go HIGH, the output of counter 21 is therefore used to block the received IR signal for a fraction, preferably $1/2$, of the bit cell period. Any incoming IR pulse during that period will be blocked and rejected. In the second mode, when the TXC_DIR line is LOW, the output of latch 17 is forced HIGH. The counter 21 therefore does not block the incoming pulse but continues running as long as no IR activity is detected. However, each incoming IR pulse resets the counter 21 when the output of latch 19 pulses HIGH. The most significant bit of counter 21 is then fed on line 22 into the receive clock input of the serial controller 24 and provides a clock signal which is in phase with the received data. Because a four bit counter is used, the counter 21 acts as a 16×oversampling phase lock loop and allows the Flash NRZI demodulation to run at speeds up to $1/16$ of the clock frequency. In the ASIC implementation, with a clock frequency of 36.86 MHz, utilizing the circuitry of FIG. 3, the maximum Flash NRZI data rate will therefore be 36.86 MHz/16 or 2.34 Mbps.

There are several advantages in using the Flash NRZI modulation in the manner of the invention. For example, one advantage is that this Flash NRZI modulation offers a degree of noise protection. In the case where a noise pulse is received, the receive line level may change more than once per bit cell. However, since the digital phase lock loop in the controller 24 is locked on the incoming data frequency, the extra inversion may be filtered out if the digital phase lock loop is designed to check for a transition in level only at the boundary of a bit cell. Although a problem will always remain if a noise pulse coincides with the bit cell boundary, this strategy reduces the chance of getting erroneous data.

A second advantage of this Flash NRZI modulation is that it is extremely easy to implement using existing, inexpensive, serial communication controllers. Unlike the IRDA modulation scheme, which requires a clock source synchronized with the data rate, Flash NRZI modulation may be implemented entirely asynchronously with very few components. Many systems that already include a standard serial controller (which produces SDLC data frames in NRZI format) could include Flash NRZI modulation by simply adding a Flash pulse generating circuit and a toggle flip-flop. No synchronized clock source is required, only access to the transmit and receive data lines. Further, modulation of NRZI formatted data is preferable to modulation of NRZ formatted data because commonly available controllers can track incoming data from NRZI edges of data with a sufficient number of transitions, which is not possible with NRZ data in synchronous format.

A third advantage of this Flash NRZI modulation is that the systems which adopt it may be backwards compatible with the IRDA modulation scheme without additional hardware. The Flash NRZI modulation scheme essentially produces a flash each time a zero is detected in the data stream. This is consistent with the IRDA standard which also produces a flash on each zero bit. The Flash NRZI system of the invention is therefore able to operate with IRDA standard devices as long as the communication controller supports asynchronous data transmission.

The NRZI with Flash IR MODEM described herein is particularly suitable for use in the Interoperable Multiprotocol Directed Infrared Wireless Communication Controller disclosed in our co-pending U.S. patent application Ser. No. 323,282 filed concurrently herewith and incorporated herein by reference. This MODEM also can be used in any communication controller that uses NRZI modulation. The present Flash NRZI modulation offers a high speed extension to the IRDA protocol.

While the invention has been particularly shown and described with respect to a preferred embodiment thereof, it will be understood by those skilled in the art that changes in form and details may be made therein without departing from the scope and spirit of the invention.

What is claimed is:

1. A system for modulating a digital data stream and producing a modulated output that is compatible with both the asynchronous mode and synchronous mode of communication, comprising:

means for inserting a zero-bit in a digital data stream whenever five consecutive 1-bits are detected therein;

means for encoding said zero-bit-containing digital data stream in NRZI format; and means, responsive to said NRZI formatted data, for generating a Flash pulse whenever a transition is detected in said NRZI formatted data, whereby a synchronous and asynchronous mode compatible modulated output is produced.

2. The system as in claim 1, wherein said Flash pulse generating means comprises means for setting the width of said Flash pulse at a fraction of a bit cell width, depending on the bit rate of said digital data stream.

3. The system as in claim 2, further comprising means for extending the duration of said Flash pulse for ¼ of a bit cell period.

4. The system as in claim 1, further comprising:

clock means having a clock rate for controlling said encoding and generating means; and means for adjusting said clock rate independently of the bit rate of said digital data stream to reduce the Flash pulse duration to a fraction of said bit rate.

5. The system as in claim 1, further comprising demodulating means for decoding said Flash pulses, said demodulating means comprising:

means for detecting said Flash pulses; and logic means for changing state whenever a Flash pulse is detected by said detecting means.

6. The system as in claim 5, wherein said demodulating means further comprises means, connected to said detecting means, for blocking the detection of said Flash pulses for ½ of the bit cell period, whereby any incoming Flash pulses during that period will be blocked and rejected.

7. The system as in claim 5, wherein said demodulating means further comprises digital phase lock loop means for locking on the frequency of the data stream containing said Flash pulses, and means for causing said digital phase lock loop means to only check for a transition in level in said data stream at the boundary of a bit cell.

8. A system for controlling an IR communications link that modulates a digital data stream in a manner compatible with both the asynchronous IRDA mode and the synchronous mode of IR communication, comprising:

means for encoding a digital data stream into NRZI format;

means for inserting a zero-bit in said stream whenever five consecutive one's occur therein prior to the encoding by said encoding means;

means for detecting transitions in said NRZI formatted data;

means, connected to said detecting means, for generating an electrical Flash pulse whenever a transition is detected in the NRZI formatted data; and means, responsive to said electrical Flash pulses, for generating IR light pulses in accordance therewith.

9. The system as in claim 8, wherein said electrical Flash pulse generating means comprises means for setting the Flash pulse width at a fraction of a bit cell width, depending on the bit rate of said digital data stream.

10. The system as in claim 8, further comprising clock means for controlling said encoding and said electrical Flash pulse generating means; and means for adjusting the clock rate independently of the data stream bit rate such that the Flash pulse duration may be set at a fraction of the bit rate of said digital data stream.

11. The system as in claim 8, further comprising demodulating means, responsive to said IR light pulses, for decoding said Flash pulses and comprising means for detecting said IR light pulses, and logic means for changing state whenever an IR light pulse is detected.

12. The system as in claim 11, further comprising counter means, in said demodulating means, for blocking the detection of IR light pulses by said detecting means for a fraction of the bit period of said data stream, whereby any incoming IR light pulse during that fraction of the bit period will be blocked and rejected.

13. The system as in claim 11, wherein said demodulating means further comprises:

means for receiving incoming data containing said IR light pulses;

digital phase lock loop means for locking on the incoming data frequency, and means for causing said digital phase lock loop means to only check for a transition in level in said data at the boundary of a bit cell.

14. A modulation method for communication links that is compatible with both the asynchronous mode and the synchronous mode of communication, comprising the steps of:

encoding a digital data stream in NRZI format;

inserting, prior to said encoding, a zero-bit in said stream whenever five consecutive one's are detected therein; and generating a Flash pulse whenever a transition is detected in the NRZI formatted data.

15. The method as in claim 14, wherein the width of said Flash pulse is set for a fraction of a bit cell width, depending on the bit rate of said data stream, and comprising the further step of extending said pulse for ¼ of a bit cell period.

16. The method as in claim 14, comprising the further steps of using a clock rate for controlling said encoding and generating steps, and adjusting said clock rate independently of the data stream bit rate such that the Flash pulse duration may be set at a fraction of said data stream bit rate.

17. The method as in claim 14, comprising the further step of decoding said Flash pulses by detecting said Flash pulses, and changing the state of a logic element whenever a Flash pulse is detected.

18. The method as in claim 17, comprising the further step of, when detecting said Flash pulses, blocking the detecting of Flash pulses for a fraction of the bit period whereby any incoming Flash pulse during that period will be blocked and rejected.

19. The method as in claim 14, comprising the further steps of using a digital phase lock loop for locking on the frequency of the data containing said Flash pulses, and causing said digital phase lock loop to only check for a transition in level in said data at the boundary of a bit cell.

20. The method as in claim 14, wherein said communication links are IR communication links and said communications modes are the asynchronous IRDA mode and a synchronous mode of IR communication.

21. A demodulator for decoding Flash pulses produced in response to transitions in NRZI formatted data containing zero-bits inserted whenever five consecutive 1-bits occurred in the data before formatting, said demodulator comprising:

means for receiving said Flash pulses;

means for detecting the receipt of said Flash pulses by said receiving means; and logic means for changing state whenever a Flash pulse is detected by said detecting means.

22. The demodulator of claim 21, wherein said flash pulses have a pulse width at a fraction of a bit cell width, and further comprising means, connected to said detecting means, for blocking the detection of said Flash pulses for ½ of the bit cell period, whereby any incoming Flash pulses during that period will be blocked and rejected.

23. The demodulator of claim 21, further comprising digital phase lock loop means for locking on the frequency of the data containing said Flash pulses, and means for causing said digital phase lock loop means to only check for a transition in level in said data at the boundary of a bit cell.

* * * * *